United States Patent [19]
Ninomiya et al.

[11] Patent Number: 5,610,948
[45] Date of Patent: Mar. 11, 1997

[54] DIGITAL DEMODULATION APPARATUS

[75] Inventors: Kunio Ninomiya, Osaka; Seiji Sakashita, Hirakata, both of Japan

[73] Assignee: Matsushita Electric Industrial Co., Ltd., Kadoma, Japan

[21] Appl. No.: 447,889

[22] Filed: May 23, 1995

[30] Foreign Application Priority Data

May 25, 1994 [JP] Japan .................................. 6-111243

[51] Int. Cl.$^6$ .................................................. H04L 27/14
[52] U.S. Cl. ...................... 375/324; 375/329; 329/304; 329/308; 329/310
[58] Field of Search .................... 375/324, 329, 375/334, 349, 350; 329/300, 304, 306, 308, 309, 310; 455/214

[56] References Cited

U.S. PATENT DOCUMENTS

| | | | |
|---|---|---|---|
| 4,750,214 | 6/1988 | Hart et al. ............................... | 455/214 |
| 5,142,553 | 8/1992 | Rosenkranz ............................. | 375/75 |
| 5,172,070 | 12/1992 | Hiraiwa et al. ......................... | 329/304 |
| 5,173,663 | 12/1992 | Ichiyoshi ................................. | 329/304 |
| 5,260,975 | 11/1993 | Saito et al. ............................... | 375/81 |
| 5,333,150 | 7/1994 | Kettering et al. ......................... | 375/80 |
| 5,355,092 | 10/1994 | Kosaka et al. ........................... | 329/304 |

FOREIGN PATENT DOCUMENTS

| | | |
|---|---|---|
| 0554036 | 8/1993 | European Pat. Off. . |
| 59-207768 | 11/1984 | Japan . |

OTHER PUBLICATIONS

Search Report for European Appl. 95107864.1, mailed Sep. 8, 1995.

"Simplified Complex Digital Sampling Demodulator", Electronics Letters, 29 Mar. 1990, vol. 26, No. 7, pp. 419–421.

*Primary Examiner*—Stephen Chin
*Assistant Examiner*—Thuy L. Nguyen
*Attorney, Agent, or Firm*—Renner, Otto, Boisselle, Sklar

[57] ABSTRACT

A demodulation apparatus of digital detection processing type of the invention offers versatility as consumer equipment in mobile communications, ATV, satellite broadcasting, CATV, and the like. A modulated wave output is obtained by multiplying an input digitally modulated wave signal by a local oscillating signal from a local oscillator. The obtained modulated wave output has a center frequency which is substantially equal to the symbol frequency. The modulated wave output is A/D converted at a rate which is four times as high as the symbol frequency, so as to be output as interleaved I and Q digital data. The I and Q data is split, and the split I and Q data are multiplied by coefficients of "+1" and "−1", respectively. The multiplied two output signals are selectively output. Thus, the data multiplied by the coefficients of "+1" and "−1" are alternately output for the I and Q signals, so as to perform the digital detection. The processed I and Q data are subjected to digital channel filter processing for spectrum shaping/An interpolation signal for one of the output signals of digital channel filters is generated and output. An amplitude level value of the interpolation signal is controlled, and then the timing of the interpolation signal is matched with the timing of the other one of the output signals of the digital channel filters. The phase error detection and the waveform shaping are performed for the I and Q data having the matched timings, and the data identification is performed.

6 Claims, 13 Drawing Sheets

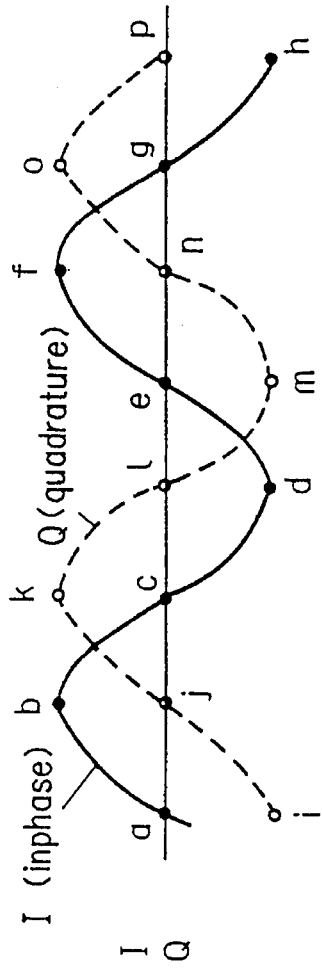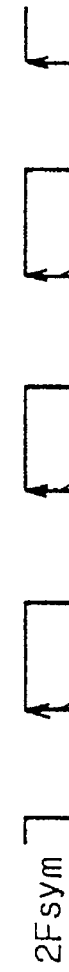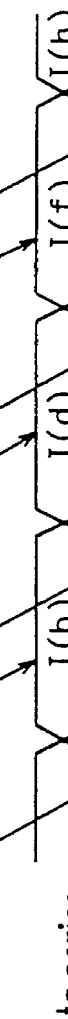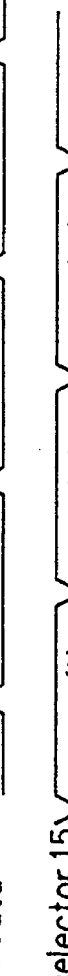
FIG. 8A
FIG. 8B  4Fsym
FIG. 8C  2Fsym
FIG. 8D  $\overline{2Fsym}$
FIG. 8E  Latch 9 I (inphase) data series
FIG. 8F  Latch 10 Q (quadrature) data series
FIG. 8G  Data selector 14 output data
FIG. 8H  Data selector 15 output data

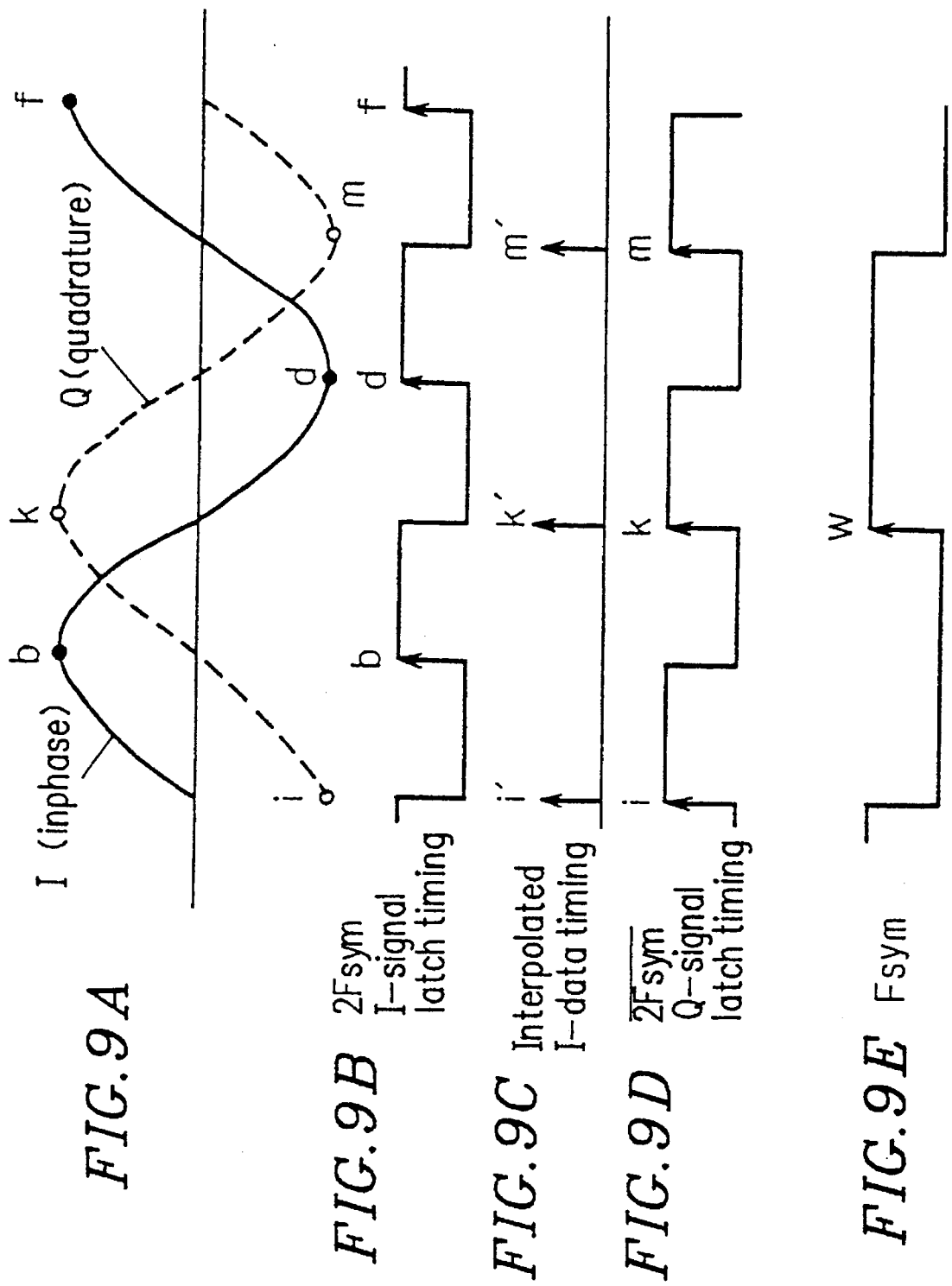

FIG.11
Level adjustment circuit
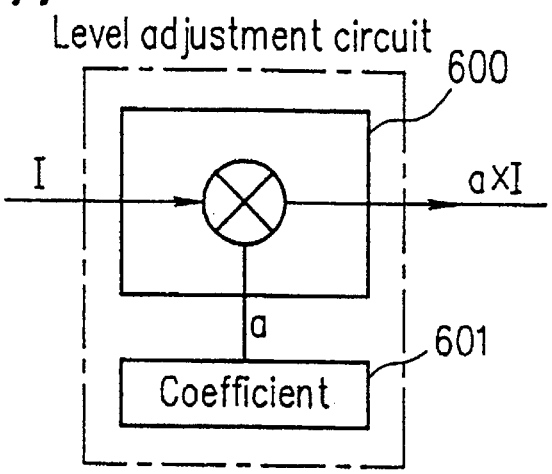
FIG.12  Waveform equalizer
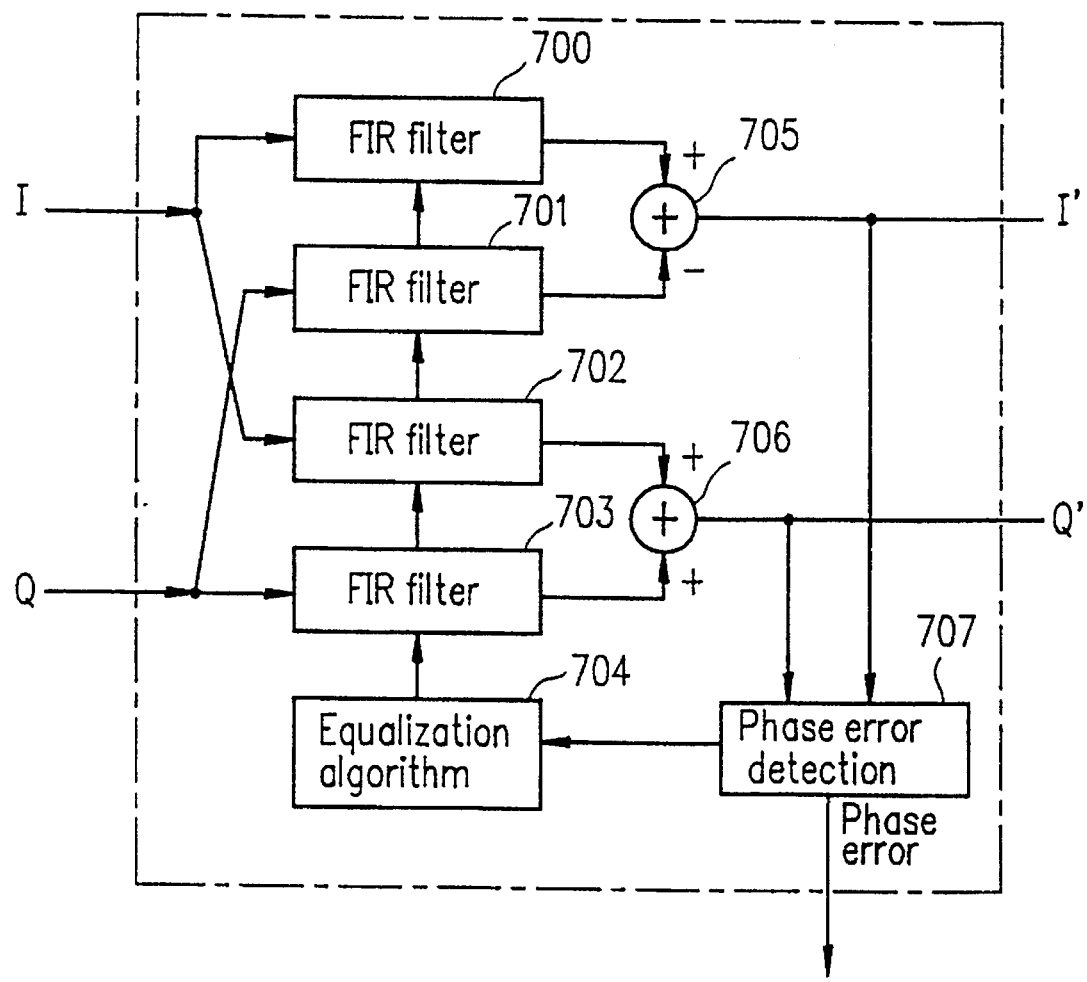

DIGITAL DEMODULATION APPARATUS

BACKGROUND OF THE INVENTION

1. Field of the Invention

The present invention relates to a demodulation apparatus for digitally modulated waves which are utilized in satellite communications, satellite broadcasting, terrestrial communications, terrestrial broadcasting, and the like.

2. Description of the Related Art

Various communication systems are developed, as communication needs increase and communication techniques are developed. Among such communication systems, a system for transmitting video signals, audio signals, and other signals adopts a digitally modulating technique which is effective for improving the quality of transmission and frequency utilization efficiency.

Conventional terrestrial digital microwave communications utilize a multiple-value quadrature amplitude modulation (QAM) such as 16 QAM and 64 QAM, because such multiple-value QAM techniques can utilize frequencies with good efficiency. Conventional satellite communications utilize binary phase shift keying (BPSK) and quadriphase phase shift keying (QPSK), because the BPSK and QPSK techniques have good ,error rates of transmission codes.

In recent years, such digital transmission techniques have become often used in consumer systems such as mobile communications and advanced television (ATV). The digital transmission technique is regarded as a promising technique because of its high-quality signal transmission characteristics, its good frequency-utilization efficiency, and its superior compatibility with other media. In terms of consumer systems, the digital transmission technique has the following significant advantages. The circuit scale is small with a simple hardware configuration, the number of portions which require adjustment is small, the temperature drift is small, and the technique is suitably implemented in an integrated circuit (IC).

FIG. 6 is a block diagram showing a conventional demodulation circuit using a digital signal processing technique. A digitally modulated wave is input to an input terminal 30. The modulated wave is split and fed to an inphase detector 31 and a quadrature detector 32, respectively. A signal from a local oscillator 34 is input into the inphase detector 31 as a local-oscillator output with 0-degree phase shift. The signal from the local oscillator 34 is also input into the quadrature detector 32 as a local-oscillator output with 90-degree phase shift, after the phase of the signal from the local oscillator 34 is shifted by a 90-degree phase shifter 33. Each of the inphase detector 31 and the quadrature detector 32 converts the frequency of the received modulated wave signal into a base-band signal, by multiplying the modulated wave signal by the signal from the local oscillator 34. The inphase- and quadrature-detector outputs are input into analog low-pass filters 37 and 38 via buffer amplifiers 35 and 36, respectively. By the function of the analog low-pass filters 37 and 38, the high-frequency components of the detector outputs are removed. The outputs of the analog low-pass filters 37 and 38 are input into analog-to-digital (A/D) converters 41 and 42 via buffer amplifiers 39 and 40, respectively. Each of the A/D converters 41 and 42 samples the received signal in accordance with a sample clock from a sample-clock generator 43, and converts the signal into a digital signal. The rate of the sample clock is twice as high as that of the occupied bandwidth of the received modulated wave signal. In general, the rate of the sample clock is four times or more as high as that of the occupied bandwidth. The digitized detector outputs are input into digital channel filters 44 and 45 which have identical frequency transfer characteristics. In the digital channel filters 44 and 45, spectrum shaping is performed. These digital channel filters are implemented as filters for forming transmission characteristics which are required for intersymbol interference in a digital data transmission. Such a filter is often referred to as a roll-off filter. The filter is designed so as to exhibit desired characteristics when the characteristics are combined with the characteristics of a filter on the transmitter side. Specifically, the spectrum shaping is performed for the respective detector outputs so that the eye aperture ratios are increased at the outputs of the digital channel filters 44 and 45. The spectrum-shaped digital detector outputs are input into a demodulator 46. The demodulator 46 demodulates I-channel data and Q-channel data, and outputs the I-channel and Q-channel data from output terminals 47 and 48.

With the above-described conventional configuration, the quadrature detection processing of two channels, i.e., inphase and quadrature channels, from the input terminal 30 to the A/D converters 41 and 42 via the detectors 31 and 32, the buffer amplifiers 35 and 36, the low-pass filters 37 and 38, and the buffer amplifiers 39 and 40 is analog signal processing. Active devices (transistors, diodes, operational amplifiers) and other devices used in the analog signal processing are easily influenced by the temperature drift, the change with a time elapse, fluctuation of source voltage, and the like. Thus, the above-described conventional demodulation circuit is insufficient in stability. Since the analog signal processing necessitates respective circuits of inphase and quadrature channels, there exist various problems as a consumer demodulation apparatus in that the number of portions requiring initial adjustment is large, the production cost is high, and the configuration is not suitably implemented in an IC. A fundamental configuration for a digital detection processing type demodulation apparatus is disclosed in Japanese Laid-Open Patent Publication No. 59-207768, but the timing processing for I and Q signals is not disclosed therein.

SUMMARY OF THE INVENTION

The demodulation apparatus for quadrature detection of digitally modulated waves of this invention includes: frequency conversion means for multiplying an input digitally modulated wave signal by a local oscillating signal from a local oscillator, and for outputting a modulated wave output in which a center frequency of the digitally modulated wave signal is substantially equal to a symbol frequency of the digitally modulated wave signal; filter means for removing a higher-frequency component included in the modulated wave output; means for generating a clock having a frequency which is four times as high as the symbol frequency; analog-to-digital conversion means for outputting interleaved I and Q digital data by sampling an output from the filter means at the clock having the frequency which is four times as high as the symbol frequency; means for splitting the digital data from the analog-to-digital conversion means into I data and Q data and for outputting the I and Q data; multiplying means for multiplying the I data and the Q data by coefficients of "+1" and "−1", respectively, and for outputting the multiplied I data and the multiplied Q data; switching means for selectively outputting the multiplied I data and the multiplied Q data; digital channel filter means for receiving the multiplied I data and the multiplied Q data, and for performing spectrum shaping for the received I and Q data; interpolation means for generating and outputting an interpolation signal for one of output signals from the digital channel filter means, the output signals respectively corresponding to the I data and the Q data; level adjustment means for controlling an amplitude level value of the generated interpolation signal; and timing control means for allowing a timing of an output signal from the level adjustment means to be matched with a timing of the other output signal of the digital channel filter means.

In one embodiment of the invetion, functions of the multiplying means and the switching means are implemented by a read only memory.

In one embodiment of the invention, the means for generating an interpolation signal of one of output signals of the digital channel filter means first obtains a sum of the output signal and a signal which is delayed by one clock and obtains a mean value thereof, so that the timing of the interpolation signal is matched with the signal of the other output signal of the digital channel filter means.

In one embodiment of the invetion, the digital channel filter means is implemented as finite impulse response type digital filters for the I data and the Q data, the digital filter for one of the I data and the Q data having an even number of taps, and the digital filter for the other of the I data and the Q data having an odd number of taps, whereby timings of the I data and the Q data are matched.

In one embodiment of the invetion, the level adjustment means for controlling an amplitude level value of the output signal from the interpolation means controls the level value by inputting the interpolation signal into a multiplier for multiplying the interpolation signal by a coefficient.

In one embodiment of the invention, the multiplying means for multiplying the I data and the Q data by coefficients of "+1" and "−1", respectively, and the switching means for selectively and alternately outputting the multiplied I data and the multiplied Q data are implemented as finite impulse response type digital filters.

In another aspect of the invention, the demodulation apparatus for digitally modulated waves, the demodulation apparatus being used in a demodulator for performing quadrature detection of the digitally modulated waves in which a modulated wave signal having a frequency converted so that a center frequency is equal to a symbol frequency is input into an analog-to-digital conversion means and sampled at a rate which is four times as high as the symbol frequency, the demodulation apparatus includes: means for splitting an output of the analog-to-digital conversion means into I data and Q data and for outputting the I and Q data; multiplying means for multiplying the I data and the Q data by coefficients, respectively; switching means for selectively outputting output signals from the multiplying means; digital channel filter means for receiving an output of the switching means, and for performing spectrum shaping for I and Q data; interpolation means for generating and outputting an interpolation signal for one of output signals from the digital channel filter means; level adjustment means for controlling an amplitude level value of the interpolation signal output from the interpolation means; timing control means for allowing a timing of an output signal from the level adjustment means to be matched with a timing of the other output signal of the digital channel filter means; waveform equalization means for receiving an output signal of the timing control means, for performing phase error detection and waveform equalization, and for outputting a phase error signal and a waveform equalized signal; means for receiving the signals output from the waveform equalization means and for obtaining a demodulated data output; and a frequency control loop having a configuration for obtaining a control signal by detecting a frequency error having a predetermined relationship with a local oscillating frequency based on the phase error signal, and for feeding back the control signal to the multiplying means.

In one embodiment of the invention, the configuration of the frequency control loop includes: means for detecting the frequency error having the predetermined relationship with the local oscillating frequency based on phase error information obtained from the modulated data; loop filter means for receiving a frequency error component, and for performing frequency limitation; numerical controlled oscillator means for receiving an output of the loop filter means, and for outputting a control signal; and data conversion circuit means for receiving two split oscillating output data from the numerical controlled oscillator means, the data conversion circuit means having sine and cosine characteristics, and wherein data output from the data conversion circuit means are supplied to the multiplying means for multiplying the I and Q data by coefficients.

In still another aspect of the invention, the demodulation apparatus for digitally modulated waves, the demodulation apparatus being used in a demodulator for performing quadrature detection of the digitally modulated waves in which a modulated wave signal having a frequency converted so that a center frequency is equal to a symbol frequency is input into an analog-to-digital conversion means and sampled at a rate which is four times as high as the symbol frequency, the demodulation apparatus includes: means for splitting an output of the analog-to-digital conversion means into I data and Q data, for multiplying one of the I data and the Q data by coefficients of "+1" and "−1", and for multiplying the other of the I data and the Q data by a control signal from a coefficient control means; and a coefficient control loop having a configuration for controlling a coefficient of a multiplier in a feedback manner by using a control signal from a decision circuit for obtaining a demodulated signal from the I data and the Q data.

In one embodiment of the invention, the configuration of the coefficient control loop includes: data decision means for detecting a level difference between the I data and the Q data, and for outputting level error information; and coefficient control means for receiving the level error information of the I data and the Q data, and for outputting a correcting coefficient for correcting levels of the I data and the Q data, and wherein the correcting coefficient is fed back to a coefficient multiplier for one of the I data and the Q data.

In still another aspect of the invention, the demodulation apparatus for digitally modulated waves includes: analog-to-digital conversion means for receiving an input modulated wave signal having a center frequency which is equal to a symbol frequency, and for outputting interleaved I and Q data by sampling the input modulate wave signal at a clock which is four times as high as the symbol frequency; a channel bandpass filter for receiving the digital signal, and for performing frequency shaping for the digital signal into a predetermined band; multiplying means for multiplying the output signal by coefficients of "+1" and "−1"; and means for selectively outputting the signal from the multiplying means at a predetermined timing.

In still another embodiment of the invention, the demodulation apparatus for digitally modulated waves, the demodulation apparatus being used in a demodulator for performing quadrature detection of the digitally modulated waves in which a modulated wave signal having a frequency converted so that a center frequency is equal to a symbol frequency is input into an analog-to-digital conversion means and sampled at a rate which is four times as high as the symbol frequency, the demodulation apparatus includes: means for splitting an output of the analog-to-digital conversion means into I data and Q data and for outputting the I and Q data; multiplying means for multiplying the I data and the Q data by coefficients, respectively; switching means for selectively outputting output signals from the multiplying means; digital channel filter means for receiving outputs of the switching means, and for performing spectrum shaping for I and Q data; interpolation means for generating and outputting an interpolation signal for both of output signals from the digital channel filter means so as to cancel a DC offset component included in a signal input to the analog-to-digital conversion means; level adjustment means for controlling an amplitude level value of one of the interpolation signal output from the interpolation means; and timing control means for allowing a timing of an output signal from the level adjustment means to be matched with a timing of the other output signal of the digital channel filter means.

In still another aspect of the invention, the demodulation apparatus for digitally modulated waves includes: analog-to-digital conversion means for receiving an input modulated wave signal having an interleaved I and Q data and for outputting a digital signal having the interleaved I and Q data by sampling the input modulate wave signal at a clock which is four times as high as the symbol frequency; and demodulation means for receiving the digital signal, and for splitting the digital signal so as to obtain the I data and the Q data, and wherein the demodulation means further includes: multiplying means for multiplying the I data and the Q data by coefficients of "+1" and "−1", respectively, and for outputting the multiplied I data and the multiplied Q data; switching means for selectively outputting the multiplied I data and the multiplied Q data; interpolation means for generating and outputting an interpolation signal for one of output signals from the digital channel filter means, the output signals respectively corresponding to the I data and the Q data; and level adjustment means for controlling an amplitude level value of the generated interpolation signal.

The function of the demodulation apparatus of the invention having the above-described configuration will be described.

The demodulation apparatus of the invention converts the frequency of a modulated wave input signal, by multiplying the modulated wave input signal by an oscillating frequency signal from the local oscillator. In the frequency conversion, the center frequency of the modulated wave signal after the converted base band is made equal to the symbol frequency. The converted output is sampled at a frequency of 4 Fsym which is four times as high as the symbol frequency Fsym (i.e., the center frequency of the modulated wave signal), so as to be converted into a digital signal. The converted digital data is latched at a timing of 2 Fsym which is ½ of the sampling frequency and at a timing which is inverted and having a phase shifted by 180 degrees from the 2 Fsym timing (/2 Fsym), so that the digital data is split into two channel data. The latched signals of the two channels are multiplied by coefficients of "+1" and "−1", respectively. Each of the multiplied signals is switched by a corresponding data selector, so that data multiplied by "+1" and "−1" are alternately output. This data is supplied to the corresponding digital channel filter. Then, for the output signal of one of the digital channel filters, an interpolation signal is formed, and the amplitude level thereof is adjusted. Accordingly, the amplitude value and the timing thereof are matched with those of the output signal of the other digital channel filter. As a result, the detection process of the inphase (I) signal and the quadrature (Q) signal is performed.

Thus, the invention described herein makes possible the advantages of (1) providing a demodulation apparatus for digitally modulated waves capable of being implemented by the small-scale hardware of an IC, (2) providing a demodulation apparatus capable of being stable in characteristics at a low cost.

These and other advantages of the present invention will become apparent to those skilled in the art upon reading and understanding the following detailed description with reference to the accompanying figures.

BRIEF DESCRIPTION OF THE DRAWINGS

FIGS. 8A to 8H are diagrams for illustrating the principle of digital detection in FIG. 1.

FIGS. 9A to 9E are diagrams for illustrating the timing in an interpolation circuit.

FIG. 11 is a block diagram showing a level adjustment circuit.

FIG. 12 is a block diagram showing a waveform equalizer.

DESCRIPTION OF THE PREFERRED EMBODIMENTS

Figure 1:
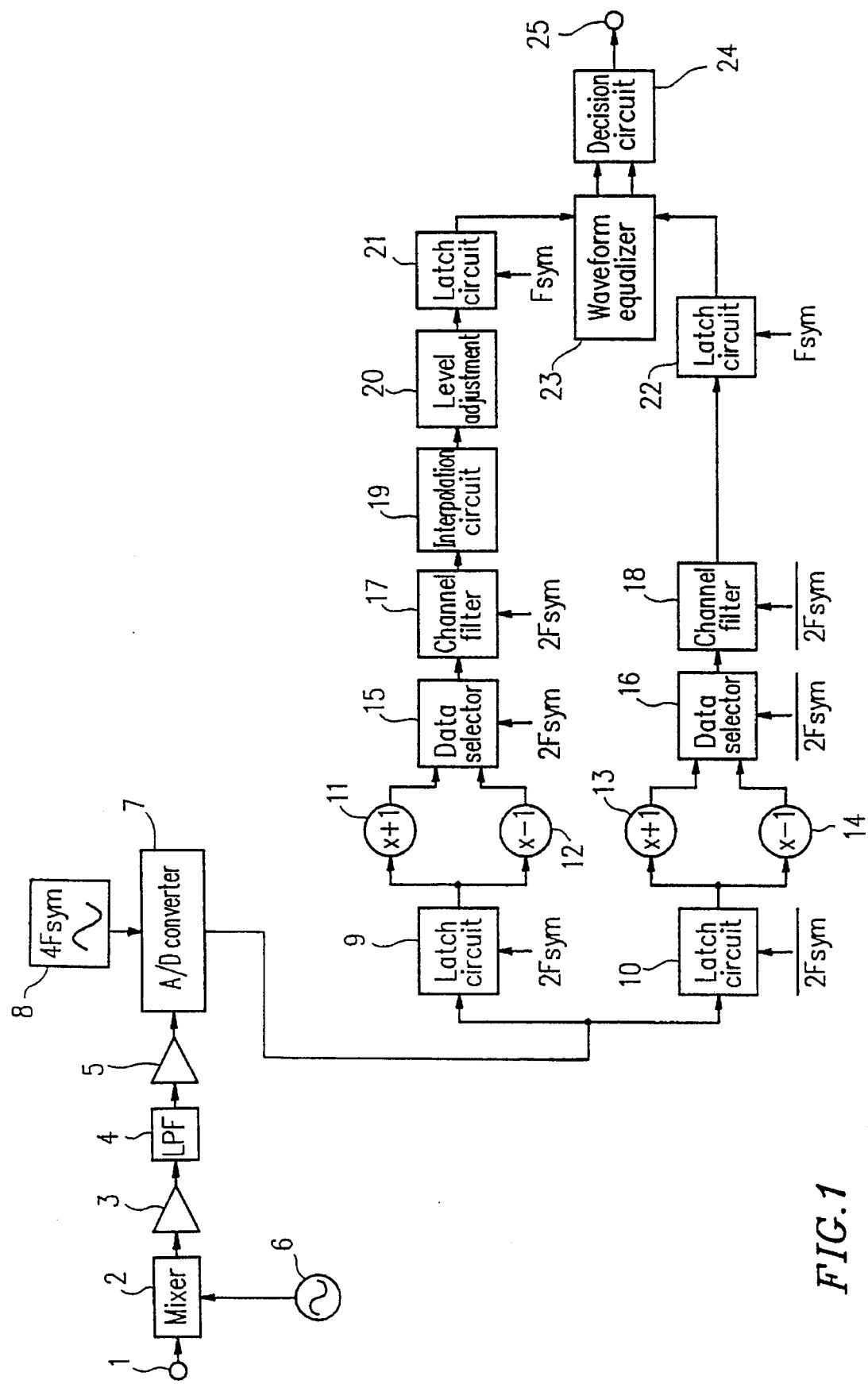
FIG. 1 is a block diagram showing a demodulation apparatus for digitally modulated waves in one example of the invention.

Hereinafter, the present invention will be described by way of illustrative examples with reference to the accompanying drawings. Components having identical functions are indicated by the same reference numerals.

Example 1

FIG. 1 is a block diagram showing a demodulation circuit in Example 1 according to the invention. A digitally modulated wave signal which is input through an input terminal 1 is input to one of two input terminals of a mixer 2. An oscillating frequency signal from a local oscillator 6 is input to the other input terminal of the mixer 2. The mixer 2 mixes the signals received at the two input terminals and performs frequency conversion into a base band so that the center frequency of the spectrum of the modulated wave signal is substantially equal to a symbol frequency. The frequency-converted modulated wave signal is input into a low-pass filter 4 for removing higher-frequency components, via a buffer amplifier 3. The output of the low-pass filter 4 is subjected to gain compensation in a buffer amplifier 5. The gain-compensated modulated wave signal is input into an analog-to-digital (A/D) converter 7, so as to be converted into digital data. A sampling clock oscillator 8 supplies a clock signal of 4 Fsym, i.e., a clock signal having a frequency which is four times as high as the symbol frequency Fsym substantially equal to the center frequency Fc of the spectrum of the modulated wave. The clock signal of 4 Fsym from the sampling clock oscillator 8 is supplied to the A/D converter 7.

The digitized modulated wave signal is split into two channels of signals, i.e., an inphase signal (hereinafter referred to as an I signal) and a quadrature signal (hereinafter referred to as a Q signal), by latch circuits 9 and 10. A clock signal having a frequency of 2 Fsym which is ½ of the sampling clock 4 Fsym is supplied to the latch circuit 9. An inverted clock (/2 Fsym) having a phase which is shifted by 180 degrees with respect to the clock signal of 2 Fsym to the latch circuit 9 is supplied to the latch circuit 10. The output of the latch circuit 9 is input into multipliers 11 and 12 which multiply the coefficients of "+1" and "−1", respectively. The output of the latch circuit 10 is input into multipliers 13 and 14 which multiply the coefficients of "+1" and "−1", respectively. A data selector 15 receives the outputs of the multipliers 11 and 12. A data selector 16 receives the outputs of the multipliers 13 and 14. The data selectors 15 and 16 alternately output the data multiplied by "+1" and "−1" received from the multipliers 11 and 12 and from the multipliers 13 and 14, respectively, at a frequency of 2 Fsym.

Figure 10:
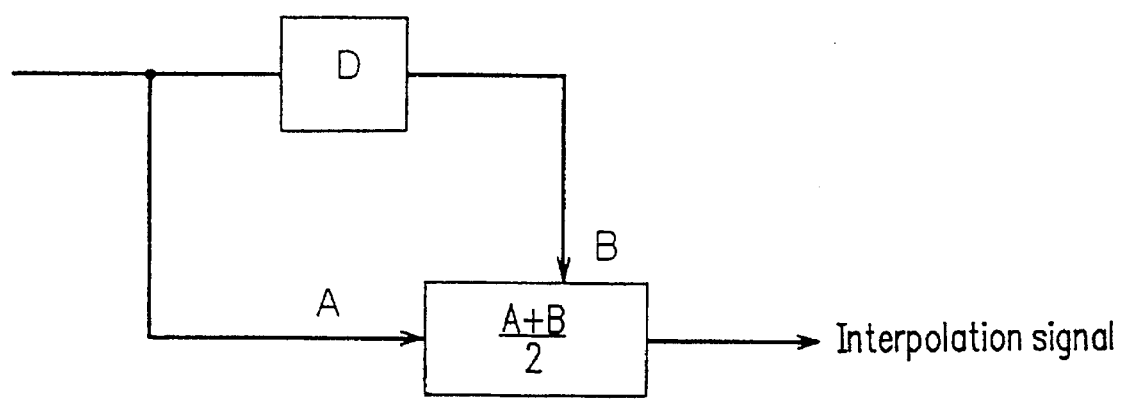
FIG. 10 is a block diagram of the interpolation circuit.

The data output from the data selectors 15 and 16 are supplied to digital channel filters 17 and 18 which have the same frequency characteristics. The digital channel filters 17 and 18 shape the waveforms of the digital data in order to obtain the required spectra. The digital channel filters 17 and 18 have, for example, a cosine roll-off characteristic, so that the digital channel filters 17 and 18 can limit the transfer bandwidth while the Nyquist's first criterion is satisfied. Only the output of the digital channel filter 17 is supplied to an interpolation circuit 19. The interpolation circuit 19 obtains a mean value of the received data and the one-clock preceding data, and produces and outputs an interpolation signal. FIG. 10 shows the configuration of the interpolation circuit 19. A level adjustment circuit 20 receives the interpolation signal, and controls the amplitude value of the interpolation signal.

As digital channel filters, finite impulse response type digital filters may be used with a sampling frequency of 4 Fsym. For example, the digital filter with 2 Fsym clock for the I data has an odd number of taps, and the digital filter with /2 Fsym clock for the Q data has an even number of taps so as to match timings of the I data and the Q data. When the digital filter has 13 taps, taps 1, 3, 5, 7, 9, 11 end 13 of the digital filter are used for the I data, and taps 2, 4, 6, 8, 10 and 12 of the digital filter are used for the Q data. This symmetrical arrangements of taps enables the I data and the Q data to be synchronized in timing.

However the number of the taps is not limited to 13. Also, the filters having even number taps and odd number taps may be used for the I data and the Q data, respectively.

Latch circuits 21 and 22 are provided for matching the timings of the interpolated and level-adjusted output of the digital channel filter 17 and the output of the digital channel filter 18. The two channels of timing-matched signals, i.e., the I signal and the Q signal are input into a waveform equalizer 23. The waveform equalizer 23 performs phase error detection and waveform shaping, and then performs data identification. The obtained data is output to a decision circuit 24. The decision circuit 24 generates demodulated data from the received I and Q signals, and outputs the demodulated data through an output terminal Next, the operation of the demodulation circuit having the above-described configuration will be described. The modulated wave signal which is input into the mixer 2 is frequency-converted so that the center frequency of the spectrum thereof is substantially equal to the symbol frequency by the oscillating frequency signal from the local oscillator 6, so as to be a baseband modulated wave. The oscillating frequency of the local oscillator 6 is set so that the center frequency (Fc) of the modulated wave after the frequency conversion is equal to the symbol frequency (Fsym).

Figure 7A:
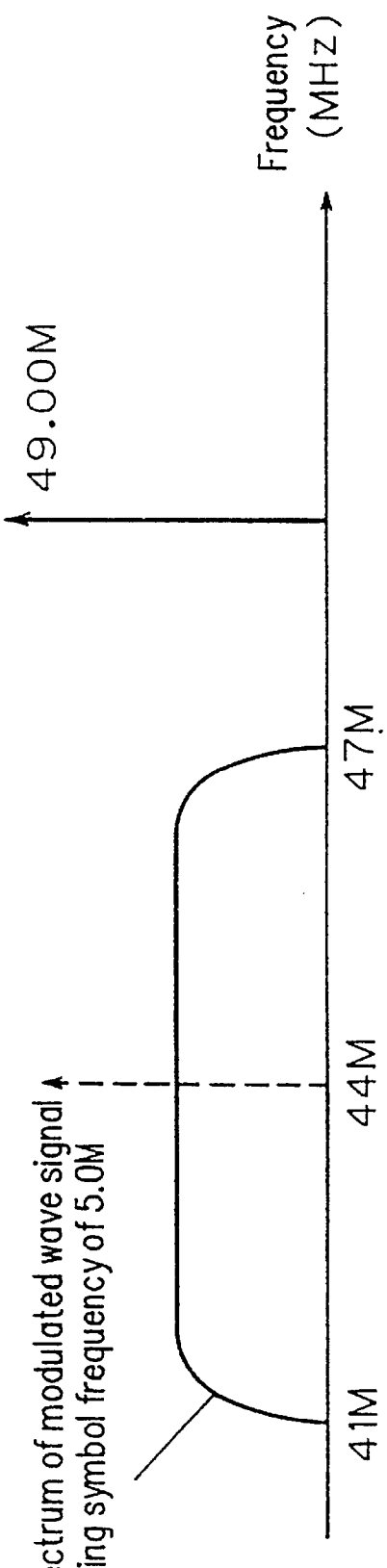
FIGS. 7A and 7B are diagrams for illustrating the frequency conversion operation in a mixer shown in FIG. 1.
Figure 7B:
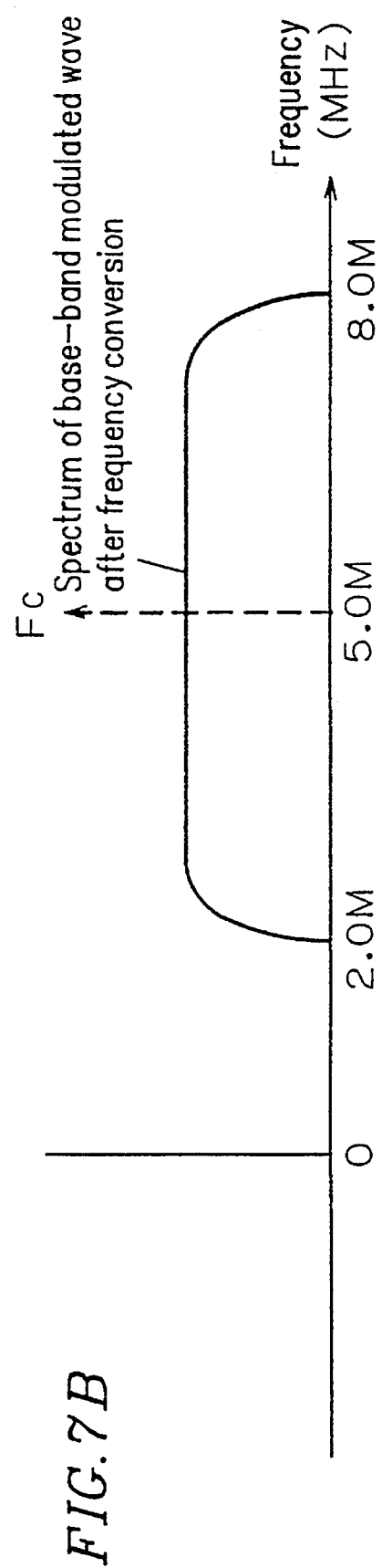

FIGS. 7A and 7B show the spectra of the modulated wave signal before and after the frequency conversion. As shown in FIG. 7A, for example, in the case where an input modulated wave signal has the center frequency of bandwidth from 41 MHz to 47 MHz, and the symbol frequency of 5.0 MHz is converted, the oscillating frequency of the local oscillator 6 is set to 49.0 MHz. After the frequency conversion to the base band, as shown in FIG. 7B, the center frequency of the spectrum of the modulated wave is 5.0 MHz which is equal to the symbol frequency (i.e., the symbol rate).

The amplitude of the frequency-converted modulated wave signal is shaped by the buffer amplifier 3, i.e., gain compensation is performed. The modulated wave signal output from the buffer amplifier 3 is supplied to the low-pass filter in order to remove the higher-frequency components, noises, and the like generated in the mixer 2. After the bandwidth is limited by the low-pass filter 4, the modulated wave signal is input into the buffer amplifier 5. In the buffer amplifier 5, the amplitude is shaped and adapted to the A/D converter 7. Then, the modulated wave signal is supplied to the A/D converter 7.

FIGS. 8A to 8H are timing diagrams for illustrating the sampling points of the input modulated wave in the A/D converter 7 and the operations of the latch circuits 9 and 10. FIG. 8A shows the waveform of the modulated analog signal input into the A/D converter 7. The waveforms of the I signal and the Q signal having the phases shifted by 90 degrees from each other are synthesized and input. In other words, the I signal and the Q signal are an interleaved signal. Herein, the I and Q signals are conceptionally indicated as sine signals having phases which are different by 90 degrees from each other. FIG. 8B shows the waveform of the clock signal having the frequency of 4 Fsym supplied from the sampling clock oscillator 8 to the A/D converter 7. The spectrum center frequency of the modulated wave after being converted to the base band is equal to the symbol frequency (Fsym). In the case where the sampling is performed at the rising edge of the 4 Fsym clock, points of a, b, c, d, e, f, g, and h of the I-signal waveform in FIG. 8A are sampled, and points of i, j, k, l, m, n, o, and p of the Q-signal waveform in FIG. 8A are sampled.

The sampled data is supplied to the latch circuit 9 and 10. A clock signal having a frequency of 2 Fsym produced from the 4 Fsym clock and having a waveform shown in FIG. 8C is supplied to the latch circuit 9. If the latch is performed at the rising edge, the points of b, d, f, and h of the I-signal waveform are latched. The latched data is a data-series signal having I(b), I(d), I(f), and I(h), as shown in FIG. 8E. An inverted clock (FIG. 8D) having a frequency of 2 Fsym and obtained by inverting the clock having the waveform shown in FIG. 8C is supplied to the latch circuit 10. If the latch is performed at the rising edge, the points of i, k, m, and o of the Q-signal waveform are latched. The latched data is a data-series signal having Q(i), Q(k), Q(m), and Q(o), as shown in FIG. 8F.

As for the data which are latched and split into two channels of signals, i.e., the I signal and the Q signal of which the phases have a quadrature relationship, the signs thereof are changed in the multipliers 11, 12, 13, and 14 by multiplying the coefficients of "+1" and "−1". Specifically, the multiplication by "+1" means that the data value is not changed, and the multiplication by "−1" means that the sign of the data value is reversed. The sign-changed data are supplied to the data selectors 15 and 16, and alternately output at a clock of 2 Fsym. At the output of the data selector 15, the results multiplied by "+1" and "−1" are alternately selected, as shown in FIG. 8G (i.e., I(b), −I(d), I(f), and −I(h)). At the output of the data selector 16, the results multiplied by "+1" and "−1" are alternately selected, as shown in FIG. 8H (i.e., −Q(i), Q(k), −Q(m), and O(o)).

Next, the digital detection will be described in detail. It is assumed that the carrier regeneration and the clock regeneration are perfectly performed. From the phase relationship between the base-band modulated wave input into the A/D converter and the sampling points shown in FIG. 8A, it is seen that the detection can be performed by sequentially multiplying the sampled data values by values of 0, 1, 0, and −1. That is, if the data I(b), I(d), I(f), and I(h) of the latch circuit 9 for the I signal are alternately multiplied by "+1" and "−1", the I signal can be detected. In a similar manner, if the data Q(i), Q(k), Q(m), and Q(o) of the latch circuit 10 for the Q signal are alternately multiplied by "+1" and "−1", the Q signal can be detected. Accordingly, the outputs of the data selectors 15 and 16 shown in FIGS. 8G and 8H are digitally detected.

The data which are digitally detected are input into the digital channel filters 17 and 18, respectively, and the spectrum shaping is performed so as to obtain the transmission characteristics required for preventing the intersymbol interference in digital transmission. The output of the digital channel filter 17 is supplied to the interpolation circuit 19. In the interpolation circuit 19, an interpolation signal with the one-clock preceding data is produced and output to the level adjustment circuit 20. The level adjustment circuit 20 performs its control operation so that the amplitude value of the output signal from the interpolation circuit 19 and the amplitude value of the output signal from the digital channel filter 18, i.e., the amplitude values of the I signal and the Q signal are equal to each other. The output of the level adjustment circuit 20 is fed to the input of the latch circuit 21. The output of the digital channel filter 18 is supplied to the latch circuit 22. The latch circuits 21 and 22 latch the data at a clock of the symbol frequency Fsym, so that the timing of the I data and the timing of the Q data are matched.

FIG. 9A shows the I signal and the Q signal. FIG. 9B shows latch timings b, d, and f of I signal. FIG. 9C shows data timings i', k', and m' interpolated by the I-signal latched data. The interpolated data timings are identical with the Q-signal latch timings i, k, and m in FIG. 9D. As a result, by performing the latch operation at the rising edge of the clock signal having the symbol frequency Fsym shown in FIG. 9E, the timings of the I data and the Q data can be matched. The I and Q latched data having the matched timings at the symbol frequency (i.e., the symbol rate) are input into the waveform equalizer 23. The phase error detection and the waveform equalization are performed in the waveform equalizer 23, and then the data are output to the decision circuit 24. The decision circuit 24 generates demodulated data from the I and Q latched data, and outputs the demodulated data through the output terminal 25.

Example 2

Figure 5:
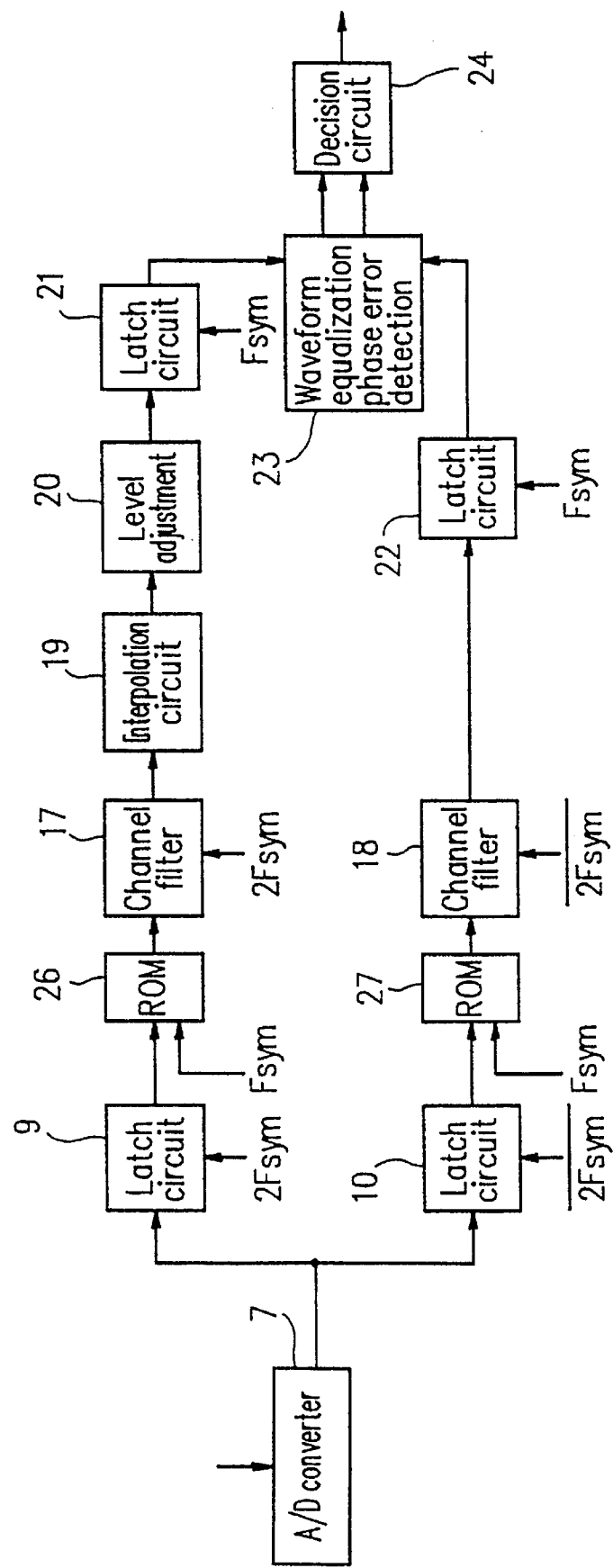
FIG. 5 is a block diagram showing a modulation apparatus for digitally modulated waves in still another example of the invention which uses a ROM.
Figure 6:
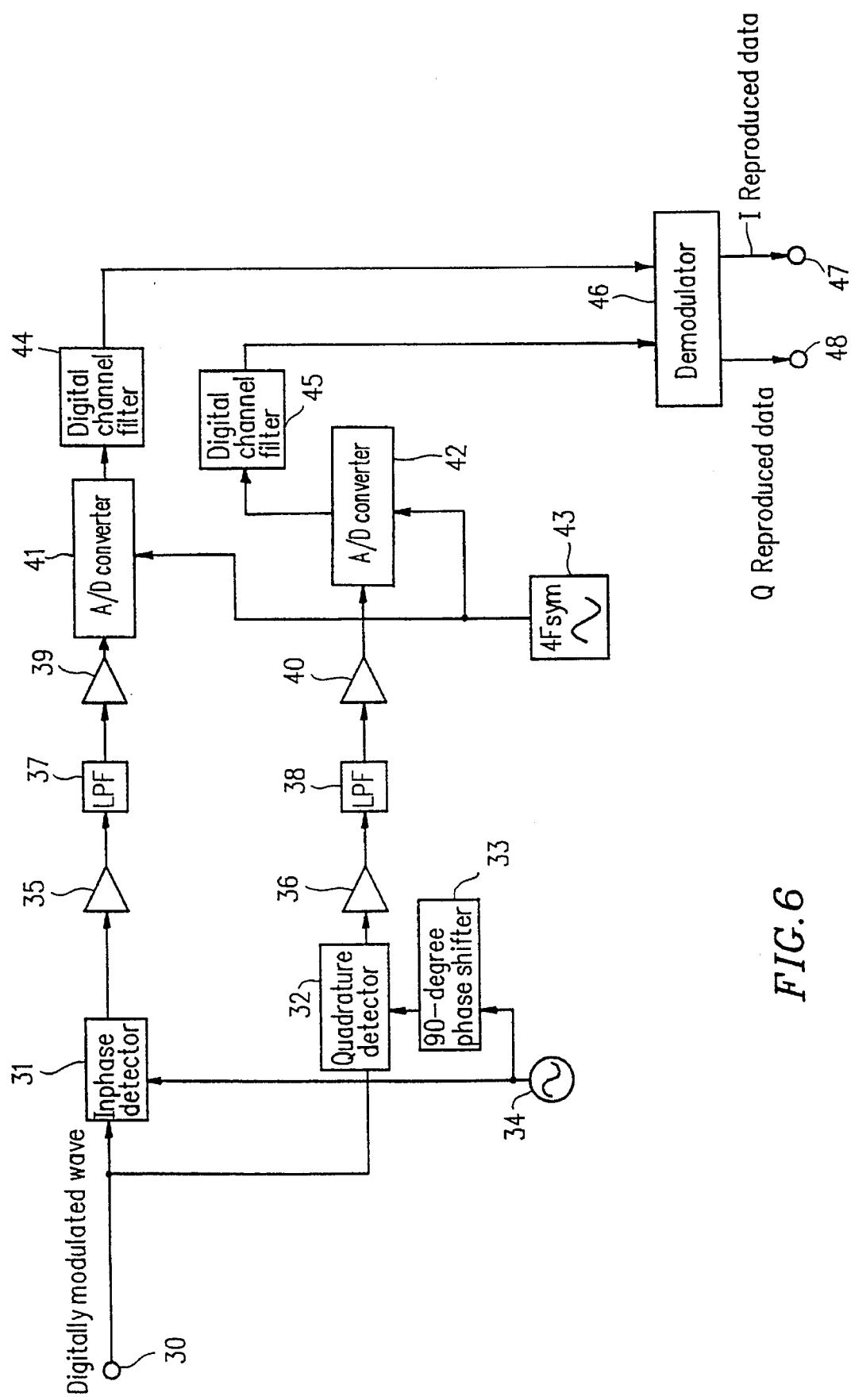
FIG. 6 is a block diagram showing a conventional modulation apparatus for digitally modulated waves.

FIG. 5 is a block diagram showing a demodulation circuit in a second example according to the invention. In the second example, instead of the multipliers 11, 12, 13, and 14, and the data selectors 15 and 16, ROMs (read only memories) 26 and 27 having the same function are used. The other circuit configurations are the same as those described in Example 1. Hereinafter, the operation of the demodulation circuit in Example 2 will be described. In FIG. 5, front stage components prior to A/D converter 7 is the same as shown in FIG. 1.

The data signal latched by the latch circuit 9 at the 2 Fsym clock and the clock signal having the symbol frequency Fsym are supplied to the ROM 26. From the relationship between the data signal timing input to the ROM 26 and the level "High" or "Low" of the clock signal having the symbol frequency Fsym, the ROM 26 converts the data for performing the same digital detection as that in Example 1. In the latch timings shown in FIGS. 9B and 9E, the clock signal Fsym is at the "Low" level at point b. Accordingly, the latched data is multiplied by "+1". That is, the ROM 26 is programmed so as to directly output the input data in such a case. In the latch timings shown FIGS. 9B and 9E, the clock signal Fsym is at the "High" level at point d. Accordingly, the latched data is multiplied by "−1". That is, the ROM 26 is programmed so as to output the input data after the sign of the data is reversed. Such programming equivalently means that the data signal operating at the 2 Fsym clock which is input to the ROM 26 is alternately multiplied by "+1" and "−1" at the frequency of the Fsym clock. Therefore, the digital detection can be performed. In the ROM 27, in the same manner as that in the ROM 26, the data signal is multiplied by "+1" and "−1", thereby performing the digital detection for the Q signal. The latch timings i and k in FIG. 9D in the latch circuit 10 and the timing of Fsym in the ROM 27 overlap the rising edges of the Fsym clock, so that it is necessary to delay the Fsym clock so as not to overlap the edge. Even if the polarity of the clock signal having the symbol frequency Fsym is inverted, the same function of the demodulation circuit is achieved because the waveform equalizer 23 compensates the 180 degree phase shift of the constellation.

Example 3

Figure 2:
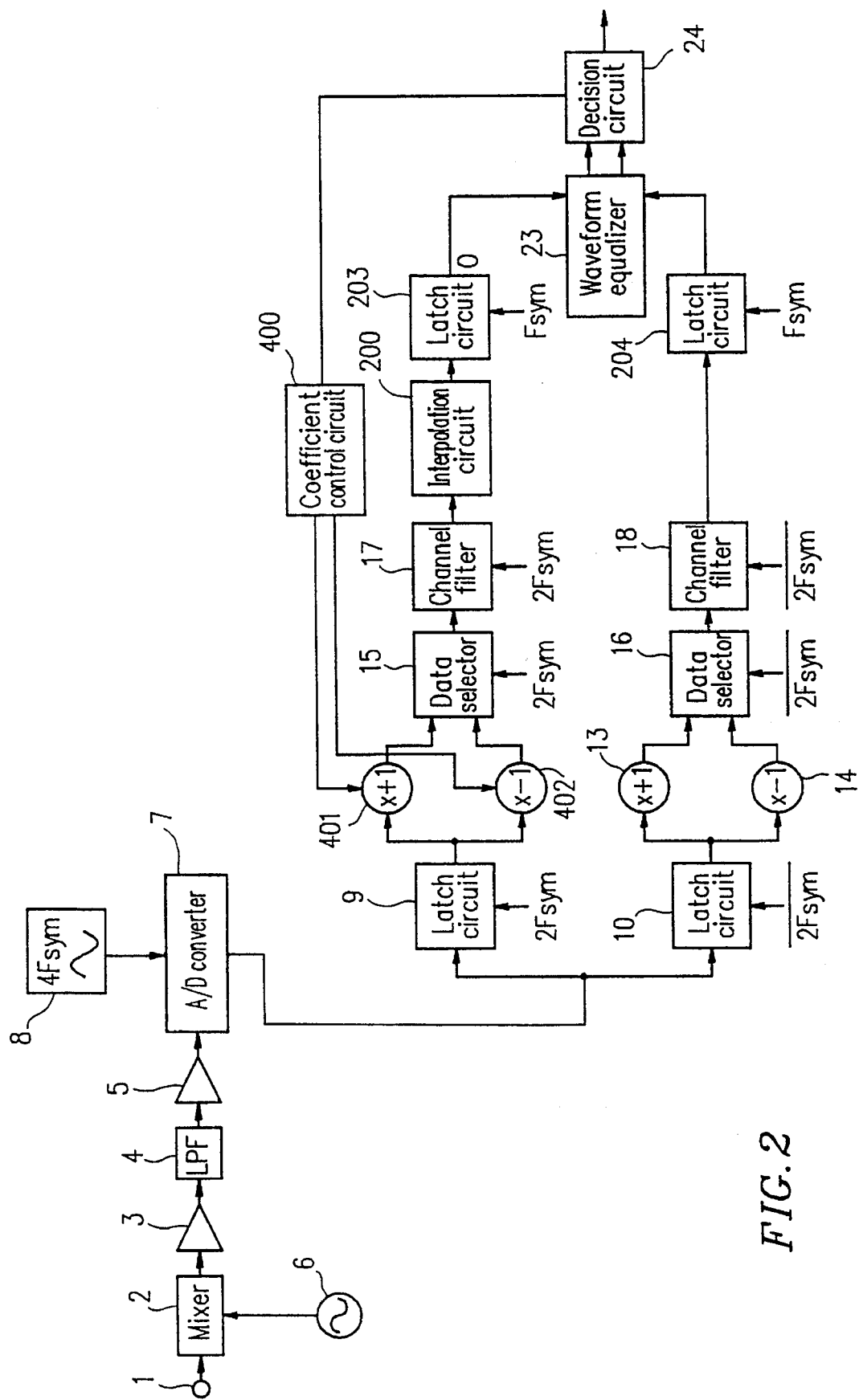
FIG. 2 is a block diagram showing a demodulation apparatus for digitally modulated waves in another example of the invention.

FIG. 2 shows a demodulation circuit for correcting a variation in the amplitude values of the I and Q signals in a third example of the invention. In this demodulation circuit, the frequency of the input modulated wave is converted so that the spectrum center frequency thereof after the conversion is equal to the symbol frequency. The frequency-converted modulated wave is input into an A/D converter, and sampled at a rate which is four times as high as the symbol frequency. Thereafter, digital quadrature detection processing is performed. In the digital detection type demodulation circuit in the third example, interpolation signals of the I and Q signals are generated. In this example, one of the two split outputs, i.e., the I signal and the Q signal having phases in a quadrature relationship is multiplied by coefficients of "+1" and "−1". As for the other output, a loop for feeding back a coefficient control signal which is produced by a coefficient control circuit 400 in accordance with the control signal from the decision circuit 24 to multipliers 401 and 402 is constructed. In FIG. 2, interpolation circuit 200, latch circuits 203 and 204 fuction the same as the interpolation circuit 19, latch circuits 21 and 22 in FIG. 1, respectively.

The decision circuit 24 which performs the demodulation of data using the signals from the waveform equalizer 23 detects an amplitude error component with respect to a predetermined data, and outputs it to the coefficient control circuit 400. Here, the predetermined data means threshold value of signal amplitude value to decide the data value. This predetermined value is set to a certain value determined commonly at a transmitting side and a receiving side. The amplitude error component is an error component between the predetermined data and the received signal amplitude value. The coefficient control circuit 400 generates correcting coefficients from the detected amplitude error information output from the decision circuit 24, and outputs the correcting coefficients to the multipliers 401 and 402. The correcting coefficients range from 0 to 2. The multipliers 401 and 402 multiply the signal from the latch circuit 9 by the generated correcting coefficients, respectively. Thus, the amplitude level control can be performed simultaneously with the digital detection operation. As a result, the levels of the I and Q signals can be made equal to each other. Accordingly, the demodulation of the I and Q signals can be stably and accurately performed.

Example 4

In a digital detection type demodulation circuit performing digital processing in which a modulated wave which has been frequency-converted so that the spectrum center frequency after the conversion is equal to the symbol frequency is sampled at a rate which is four times as high as the symbol frequency in an A/D converter, if the symbol frequency of the modulated wave after the frequency conversion is not equal to the spectrum center frequency of the modulated wave after the frequency conversion, the I and Q signals which are detected by digital quadrature detection are not accurately reproduced and the data modulation is erroneously performed.

Figure 3:
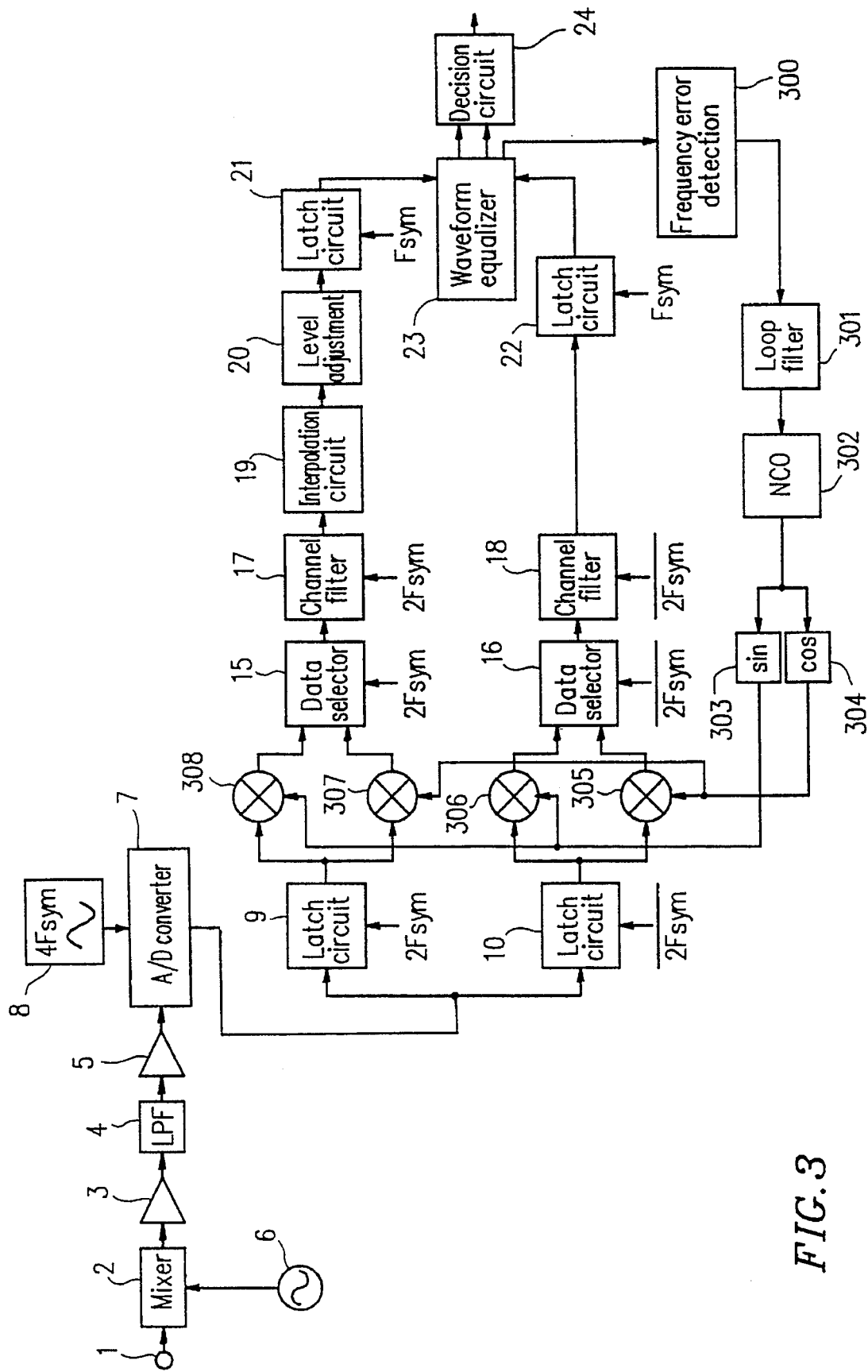
FIG. 3 is a block diagram showing a demodulation apparatus for digitally, modulated waves in still another example of the invention.

FIG. 3 is a block diagram showing a digital detection type demodulation circuit in a fourth example of the invention for solving the above-mentioned problem. The demodulation circuit in the forth example includes a frequency control loop for feeding back a control signal which is obtained by detecting a predetermined frequency error from phase-error information of the waveform equalizer 23, to multipliers 305, 306, 307, and 308.

The waveform equalizer 23 detects a phase error based in the input I and Q signals, and outputs information based on the phase error to a frequency error detector 300. The frequency error detector 300 detects a frequency error between a received carrier wave and a reproduced carrier wave, and outputs a frequency error signal $\Delta\omega$ to a loop filter 301. The loop filter 301 smooths the frequency error signal $\Delta\omega$ by integration, and outputs a resulting frequency control signal to a numerical controlled oscillator (NCO) 302. The NCO 302 outputs an oscillating signal $-\Delta\omega t$ to a sine-characteristic converter 303 and a cosine-characteristic converter 304 based on the input frequency control signal. Signals which are data-converted into the sine characteristic and the cosine characteristic are input into multipliers 306 and 308, and the multipliers 305 and 307, respectively. In the multipliers 305 to 308, the latched data is multiplied by the sine data and the cosine data, respectively. Accordingly, the frequency correction can be performed simultaneously with the detection operation, so that the I and Q data demodulation can be stably performed.

Supposing that the frequency error component is represented as $\exp(j\Delta\omega t)$, the output signals from latch circuits 9 and 10 are expressed as $(I+jQ)\exp(j\Delta\omega t)$. Multiplying the output signals from latch circuits 9 and 10 by the output signals from the sine-characteristic converter 303 and the cosine-characteristic converter 304 means that multiplying $(I+jQ)\exp(j\Delta\omega t)$ by $\exp(-j\Delta\omega t)$ so as to cancel the frequency error because $\exp(-j\Delta\omega t)$ is equal to $(\cos\Delta\omega t - j\sin\Delta\omega t)$.

Example 5

In a digital detection type demodulation circuit performing digital processing in which a modulated wave which has been frequency-converted so that the spectrum center frequency after the conversion is equal to the symbol frequency is sampled at a rate which is four times as high as the symbol frequency in an A/D converter, the signal processing is performed in two channels after the A/D conversion, so that the circuit scale is inevitably increased.

Figure 4:
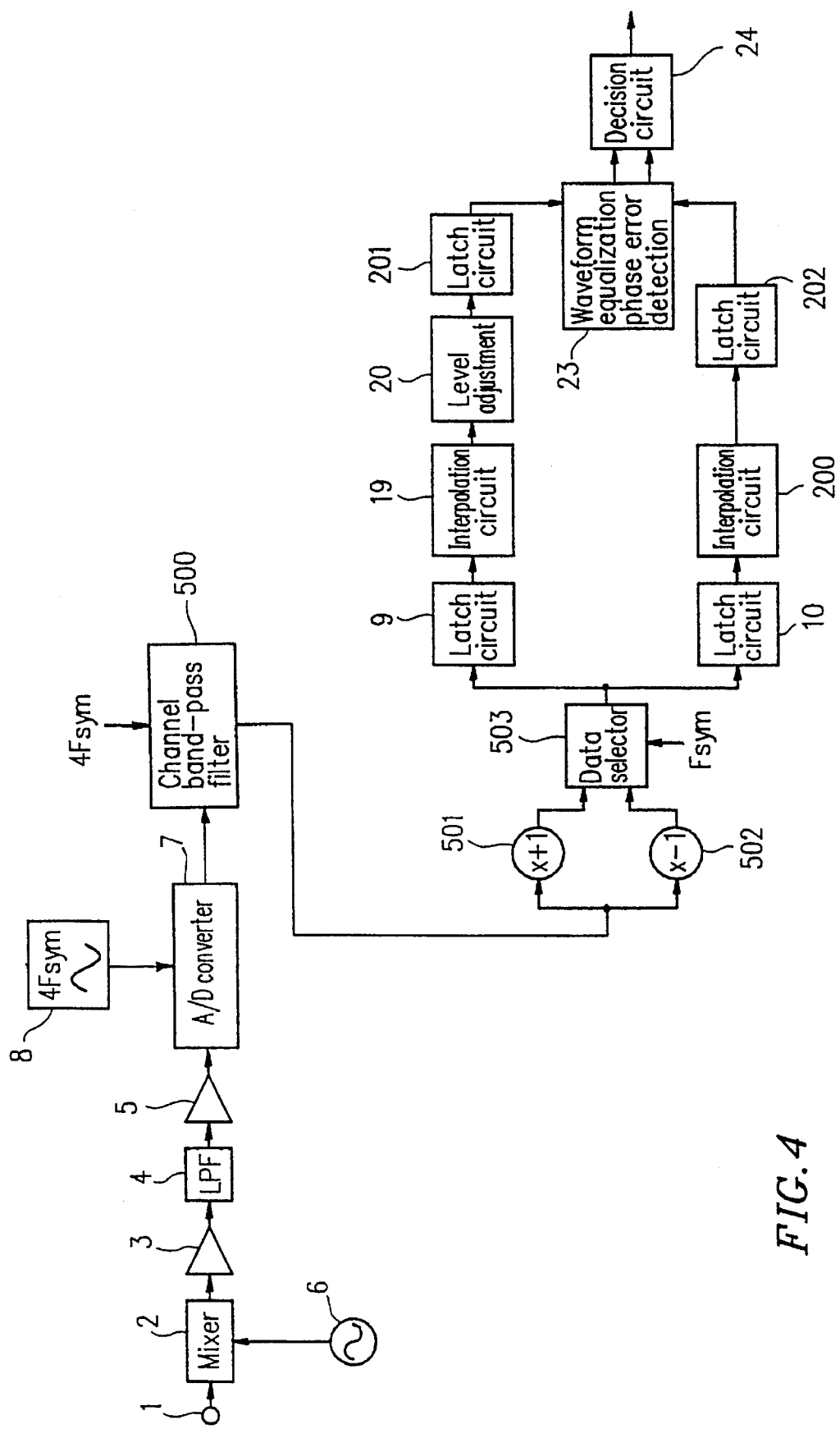
FIG. 4 is a block diagram showing a demodulation apparatus for digitally modulated waves in still another example of the invention.

FIG. 4 is a block diagram of a demodulation circuit in a fifth example of the invention for solving the above-mentioned problem. In the demodulation circuit of this example, the processing up to the digital detection operation is performed in one channel. A signal which is digitized in the A/D converter 7 is input into a digital channel bandpass filter (BPF) 500 for shaping the spectrum into a desired band, and then output to multipliers 501 and 502. The digital BPF 500 having a roll-off characteristic performs spectrum shaping of the interleaved I and Q signal. The multipliers 501 and 502 multiply the input signal by "+1" and "−1", and the results are output to a data selector 503. The data selector 503 switches the input signal so as to generate a signal series of +I, +Q, −I, and −Q, and outputs the signal series. That is, similar to the relationship shown in FIGS. 8A and 8B between the input modulated wave and the sampling clock 4 Fsym of the A/D converter (i.e., the output sequence is +I(b), +Q(k), −I(d), and −Q(m)), a data series is generated as if data is sampled at a rate equal to 4 Fsym which is four times as high as the symbol frequency by the A/D converter. The data series is output to the latch circuits, and the data demodulation is performed in the same way as in the aforementioned example. Latch circuits 201 and 202 fuction the same as the latch circuits 21 and 22.

In this example, only one data selector 503 is used because detection operation is performed with 4 Fsym timing clock, as shown in FIG. 4. By contrast to the demodulator apparatus shown in FIG. 1 where the detection operation is performed by the two data selectors with the 2 Fsym timing clock.

It is easily understood by a person having an ordinary skill in the art that, in a demodulation apparatus having a configuration in which the processing up to the digital detection operation is performed in one channel, any one of the circuit configurations described in Examples 1 to 4 can be adopted.

FIG. 11 shows a block diagram of the level adjustment circuit 20 used for the examples of the invention. The level adjustment circuit 20 includes a multiplier 600 and a coefficient circuit 601. For example, I signal is multiplied by a coefficient value (a) provided by the coefficient circuit 601 whereby generating output data (a×I) so as to control an amplitude level of I signal.

FIG. 12 shows a block diagram of the waveform equalizer 23 used for the examples of the invention. The waveform equalizer 23 includes finite impulse response (FIR) filters 700, 701, 702 and 703, adders 705 and 706, phase error detector 707, and equalization algorithm processing unit 704. The operation of the waveform equalizer 23 will be described below.

I data is input to the FIR filters 700 and 702 and then multiplied by a filtering coefficient from the equalization algorithm processing unit 704 whereby filtering operation is performed. Q data is input to the FIR filters 701 and 703 and then multiplied by a filtering coefficient from the equalization algorithm processing unit 704 whereby filtering operation is performed. I and Q data subject to filtering processing for waveform equalization by each of FIR filters 700, 701, 702 and 703 are input to the adders 705 and 706, respectively. The adder 705 performs an operation of (I−Q) and the adder 706 performs an operation of (I+Q) so as to obtain waveform-equalized I' and Q' data as outputs.

The phase error detector 707 detects phase error between a received carrier wave and a reproduced carrier wave and generates a phase error signal as an output signal. The phase error signal is input to the equalization algorithm processing unit 704 so as to generate filtering coefficients for waveform equalization.

Example 6

Figure 13:
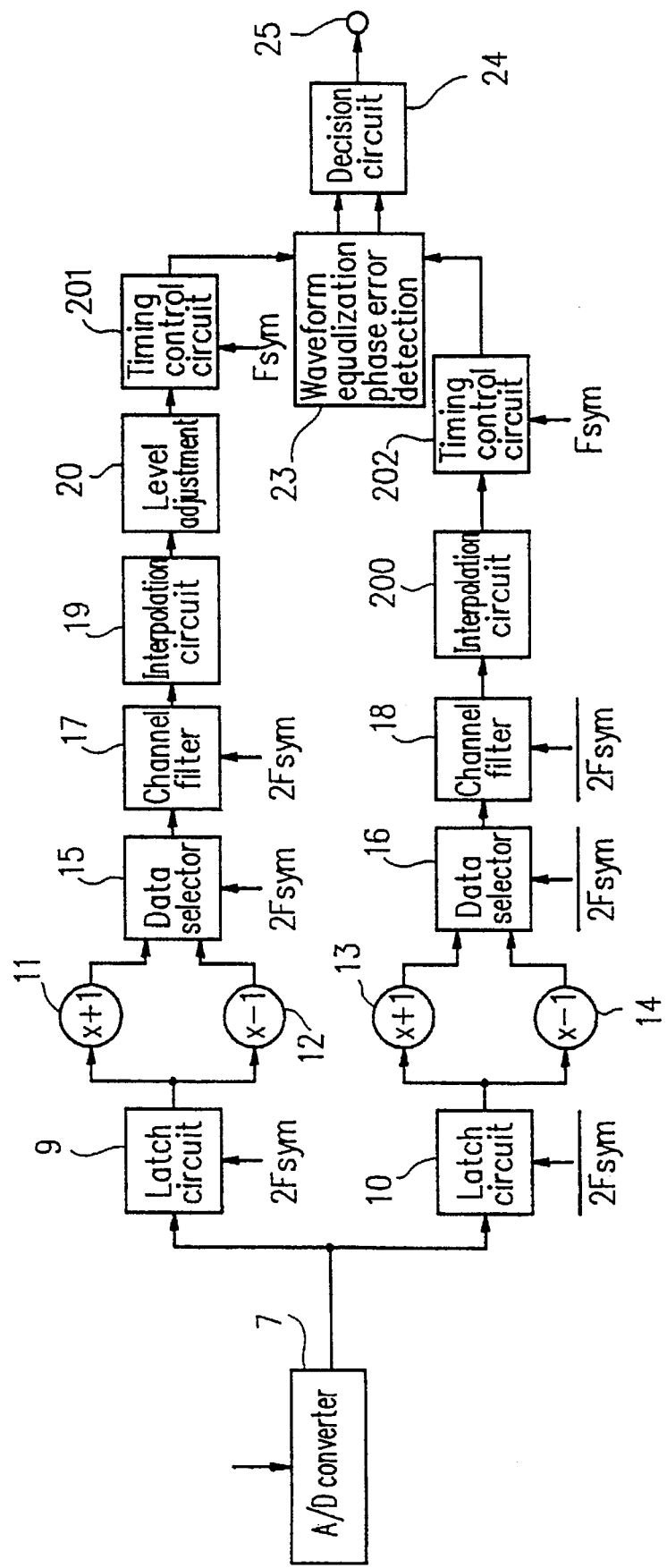
FIG. 13 is a block diagram showing a demodulation apparatus for digitally modulated waves in still another example of the invention.

In a digital detection type demodulation circuit, I and Q signals which are digitally detected are not correctly reproduced, i.e., data demodulation cause data errors when a modulated wave input to an A/D converter is shifted in voltage by DC offset. FIG. 13 shows a block diagram of a demodulation circuit in a sixth example of the invention for solving the above-mentioned problem. Output signals of digital channel filters 17 and 18 for I and Q signals are input to the interpolation circuit 19 and 200, respectively. Output signal from the interpolation circuit 19 is input to the level adjustment circuit 20. Output signal from the level adjustment circuit 20 and output signal from the interpolation circuit 200 are input to timing control circuits 201 and 202. The waveform equalizer 23 for phase detection and waveform equalization receives output signals from the timing control circuits 201 and 202. In FIG. 13, front stage components prior to A/D converter 7 is the same as shown in FIG. 1.

The interpolation circuit 19 and 200 receive the output signals of digital channel filters 17 and 18 and generate interpolated output signals respectively, by averaging current data and data immediately before the current data by one clock. The level adjustment circuit 20 adjusts amplitude levels of I and Q signals so that the amplitude of the I signal is equal to that of Q signal. The timing control circuits 201 and 202 control latch timings of the output signal from the level adjustment circuit 20 and the output signal from the interpolation circuit 200 so that the timings of the I and Q signals are synchronized. The synchronized I and Q signals are then input to the waveform equalizer 23.

In this example, DC offset component of the modulated wave input to the A/D converter 7 is eliminated by generating the interpolating signals of the I and Q signals. At the same time, correct data demodulation is realized by utilizing the I and Q data which have the same amplitude and the same timing.

Figure 14:
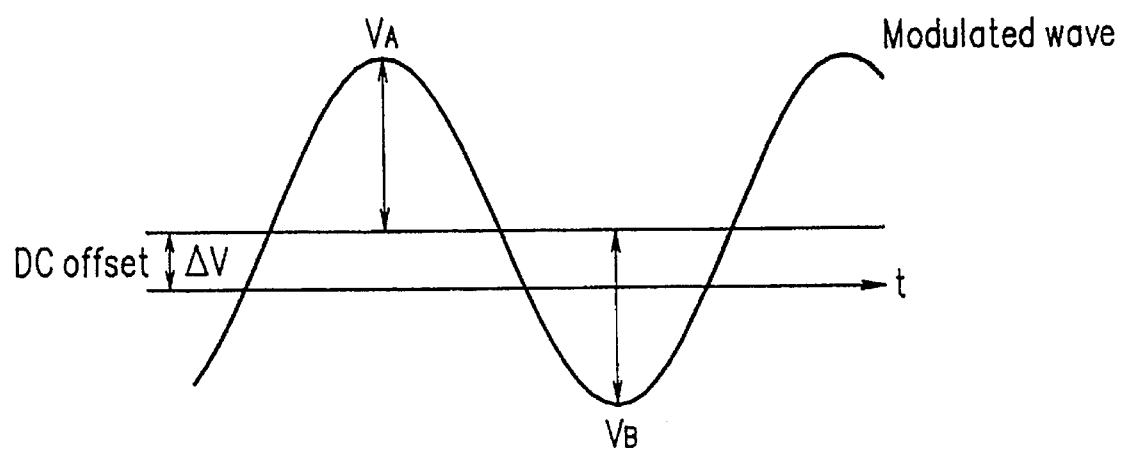
FIG. 14 is a diagram for illustrating a waveform of the modulated wave when DC offset exists.
Figure 15:
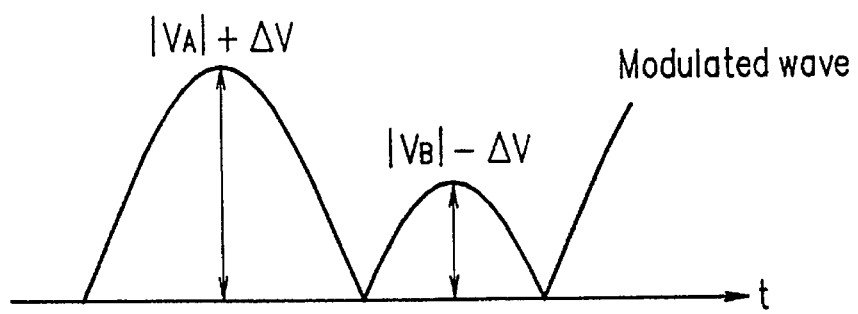
FIG. 15 is a diagram for illustrating a waveform of the modulated wave after detection when DC offset exists.

When DC offset is generated at the A/D converter 7, DC offset $\Delta V$ is superimposed on a modulated wave having peak voltage values $V_A$ and $V_B$, as shown in FIG. 14. FIG. 15 shows the modulated wave after detection operation. The detected wave has different peak voltage values ($|V_A|+\Delta V$) and ($|V_B|-\Delta V$) due to DC offset component. By interpolating the detected wave having different peak voltage values ($|V_A|+\Delta V$) and ($|V_B|-\Delta V$), the following voltage value is obtained.

$$((|V_A|+\Delta V)+(|V_B|-\Delta V))/2=(|V_A|+|V_B|)/2$$

Thus obtained value is equal to a voltage value of an interpolated modulated wave when DC offset does not exist. This means that DC offset is eliminated by the interpolation circuits 19 and 200.

As described above, according to the invention, in a modulation apparatus for digitally modulated waves, the analog signal processing section up to the A/D conversion is performed in one channel. After the A/D conversion, digital signal processing is performed from the inphase detection and the quadrature detection to the data identification and demodulation, so that the scale of the hardware configuration can be made small. Thus, the modulation apparatus can be easily implemented in an IC, and adjustment is not required because of the digital signal processing. In addition, it is possible to provide a stable modulation apparatus suitable for a consumer's purpose with reduced temperature drift and fluctuation of source voltage at a low cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A demodulation apparatus for quadrature detection of digitally modulated waves, comprising:

frequency conversion means for multiplying an input digitally modulated wave signal by a local oscillating signal from a local oscillator, and for outputting a modulated wave output in which a center frequency of the digitally modulated wave signal is substantially equal to symbol frequency of the digitally modulated wave signal;

filter means for removing a higher-frequency component included in the modulated wave output;

means for generating a clock having a frequency which is four times as high as the symbol frequency;

analog-to-digital conversion means for outputting interleaved I and Q digital data by sampling an output from the filter means at the clock having the frequency which is four times as high as the symbol frequency;

means for splitting the digital data from the analog-to-digital conversion means into I data and Q data and for outputting the I and Q data;

multiplying means for multiplying the I data and the Q data by coefficients of "+1" and "−1", respectively, and for outputting the multiplied I data and the multiplied Q data;

switching means for selectively outputting the multiplied I data and the multiplied Q data;

digital channel filter means for receiving the multiplied I data and the multiplied Q data, and for performing spectrum shaping for the received I and Q data;

interpolation means for generating and outputting an interpolation signal for one of output signals from the digital channel filter means, the output signals respectively corresponding to the I data and the Q data;

level adjustment means for controlling an amplitude level value of the generated interpolation signal; and timing control means for allowing a timing of an output signal from the level adjustment means to be matched with a timing of the other output signal of the digital channel filter means.

2. A demodulation apparatus for digitally modulated waves according to claim 1, wherein functions of the multiplying means and the switching means are implemented by a read only memory.

3. A demodulation apparatus for digitally modulated waves according to claim 1, wherein the means for generating an interpolation signal of one of output signals of the digital channel filter means first obtains a sum of the output signal and a signal which is delayed by one clock and obtains a mean value thereof, so that the timing of the interpolation signal is matched with the signal of the other output signal of the digital channel filter means.

4. A demodulation apparatus for digitally modulated waves according to claim 1, wherein the digital channel filter means is implemented as finite impulse response type digital filters for the I data and the Q data, the digital filter for one of the I data and the Q data having an even number of taps, and the digital filter for the other of the I data and the Q data having an odd number of taps, whereby timings of the I data and the Q data are matched.

5. A demodulation apparatus for digitally modulated waves according to claim 1, wherein the level adjustment means for controlling an amplitude level value of the output signal from the interpolation means controls the level value by inputting the interpolation signal into a multiplier for multiplying the interpolation signal by a coefficient.

6. A demodulation apparatus for digitally modulated waves according to claim 1, wherein the multiplying means for multiplying the I data and the Q data by coefficients of "+1" and "−1", respectively, and the switching means for selectively and alternately outputting the multiplied I data and the multiplied Q data are implemented as finite impulse response type digital filters.

* * * * *